US006964039B2

(12) United States Patent
Heeb

(10) Patent No.: US 6,964,039 B2
(45) Date of Patent: Nov. 8, 2005

(54) METHOD TO CREATE OPTIMIZED MACHINE CODE THROUGH COMBINED VERIFICATION AND TRANSLATION OF JAVA™ BYTECODE

(75) Inventor: Beat Heeb, Zurich (CH)

(73) Assignee: Esmertec AG, Dubendorf (CH)

(*) Notice: Subject to any disclaimer, the term of this patent is extended or adjusted under 35 U.S.C. 154(b) by 705 days.

(21) Appl. No.: 10/016,794

(22) Filed: Oct. 29, 2001

(65) Prior Publication Data

US 2002/0138825 A1 Sep. 26, 2002

Related U.S. Application Data

(60) Provisional application No. 60/255,096, filed on Dec. 13, 2000.

(51) Int. Cl.[7] .................................................. G06F 9/45

(52) U.S. Cl. ........................ 717/148; 717/118; 717/153

(58) Field of Search ................................ 717/151–153, 717/114, 116, 118, 126, 136, 139, 140, 146, 148; 718/1

(56) References Cited

U.S. PATENT DOCUMENTS

| | | | | |
|---|---|---|---|---|
| 5,590,331 A | | 12/1996 | Lewis et al. | 717/144 |
| 5,630,066 A | * | 5/1997 | Gosling | 709/221 |
| 5,668,999 A | * | 9/1997 | Gosling | 717/126 |

(Continued)

OTHER PUBLICATIONS

Alpern et al., The Jalapeno virtual machine, 2000, IBM Systems Journal, vol. 39, No. 1, 2000.*

Adl–Tabatabai et al.: "Fast, Effective Code Generation in a Just–In–Time Java Compiler", Intel Corporation, May 1998.

Hazi et al.: "Techniques for Obtaining High Performance in Java Programs", ACM Computing Survery, vol. 32, No. 3, Sep. 2000, pp 213–240.

Suganuma et al.: "Overview of the IBM Java Just–In–Time Compiler", IBM Systems Journal, vol. 39, No. 1, 2000.

Per Bothner: "A Gcc–based Java Implementation", 1997 IEEE, pp. 174–178.

Lindholm et al: "The Java Virtual Machine Specification", Addison Wesley, Mountain View, CA, 1997.

Tim Lindholm and Frank Yellin, "The JAVA Virtual Machine Specification—Second Edititon", http://java.sun.com/docs/books/vmspec/2$^{nd}$–edition/html/Introduction.doc.html.

Gary McGraw and Ed Felten, "Securing JAVA, Getting Down To Business With Mobil Code", http://www.securingjava.com/chapter–two/chapter–two–6.html.

"The GNU Compiler For The JAVA Programming Language", http://gcc.gnu.org/java/index.html.

Dave Dittrich and Nathan Dors, "JAVA", http://staff.washington.edu/dittrich/talks/java/.

"The JAVA Tutorial", http://java.sun.com/docs/books/tutorial/getStarted/problems/index.html.

"JAVA Optimization" http://www–2.cs.cmu.edu/~jch/java/compilers.html.

*Primary Examiner*—Anthony Nguyen-Ba
(74) *Attorney, Agent, or Firm*—Perkins Coie LLP

(57) ABSTRACT

The present invention is a new method and apparatus to perform combined compilation and verification of platform independent bytecode instruction listings into optimized machine code. More specifically, the present invention creates a new method and apparatus in which bytecode compilation instructions are combined with bytecode verification instructions, producing optimized machine code on the target system in fewer programming steps than traditionally known. The new method, by combining the steps required for traditional bytecode verification and compilation, increases speed and applicability of platform independent bytecode instructions.

24 Claims, 6 Drawing Sheets

U.S. PATENT DOCUMENTS

| | | | | | |
|---|---|---|---|---|---|
| 5,692,047 | A | | 11/1997 | McManis | 713/167 |
| 5,740,441 | A | | 4/1998 | Yellin et al. | 717/134 |
| 5,748,964 | A | * | 5/1998 | Gosling | 717/126 |
| 5,815,661 | A | * | 9/1998 | Gosling | 709/216 |
| 5,848,274 | A | | 12/1998 | Hamby et al. | 717/153 |
| 5,909,579 | A | | 6/1999 | Agesen et al. | 717/131 |
| 5,970,249 | A | | 10/1999 | Holzle et al. | 717/153 |
| 5,978,586 | A | | 11/1999 | Baisley et al. | 717/158 |
| 5,999,731 | A | | 12/1999 | Yellin et al. | 717/126 |
| 6,052,732 | A | | 4/2000 | Gosling | |
| 6,058,482 | A | | 5/2000 | Liu | 713/201 |
| 6,070,239 | A | | 5/2000 | McManis | 713/187 |
| 6,075,940 | A | * | 6/2000 | Gosling | 717/126 |
| 6,092,147 | A | | 7/2000 | Levy et al. | 711/6 |
| 6,110,226 | A | | 8/2000 | Bothner | 717/153 |
| 6,139,199 | A | | 10/2000 | Rodriguez | 717/159 |
| 6,151,703 | A | | 11/2000 | Crelier | 717/136 |
| 6,170,083 | B1 | | 1/2001 | Adl-Tabatabai | |
| 6,473,777 | B1 | * | 10/2002 | Hendler et al. | 707/206 |
| 2003/0084431 | A1 | | 5/2003 | Kobayashi | |
| 2003/0084432 | A1 | | 5/2003 | Kobayashi | |

* cited by examiner

METHOD TO CREATE OPTIMIZED MACHINE CODE THROUGH COMBINED VERIFICATION AND TRANSLATION OF JAVA™ BYTECODE

CROSS REFERENCE TO RELATED APPLICATIONS

This Application claims the benefit of U.S. Provisional Application No. 60/255,096 filed Dec. 13, 2000, the disclosure of which is incorporated herein by reference.

STATEMENT REGARDING FEDERALLY SPONSORED RESEARCH

Not applicable.

BACKGROUND OF INVENTION

1. Field of Invention

The present invention is related to the combined compilation and verification of platform neutral bytecode computer instructions, such as JAVA. More specifically, the present invention relates to a new method of creating optimized machine code from platform neutral bytecode on either the development or target system by concurrently performing bytecode verification and compilation.

2. Description of Related Art

The benefit of an architecture neutral language such as JAVA is the ability to execute such language on a wide range of systems once a suitable implementation technique, such as a JAVA Virtual Machine, is present. The key feature of the JAVA language is the creation and use of platform neutral bytecode instructions, which create the ability to run JAVA programs, such as applets, applications or servlets, on a broad range of diverse platforms. Typically, a JAVA program is compiled through the use of a JAVA Virtual Machine (JVM) which is merely an abstract computing machine used to compile the JAVA program (or source code) into platform neutral JAVA bytecode instructions, which are then placed into class files. The JAVA bytecode instructions in turn, serve as JVM instructions wherever the JVM is located. As bytecode instructions, the JAVA program may now be transferred to and executed by any system with a compatible JAVA platform. In addition, any other language which may be expressed in bytecode instructions, may be used with the JVM.

Broadly speaking, computer instructions often are incompatible with other computer platforms. Attempts to improve compatibility include "high level" language software which is not executable without compilation into a machine specific code. As taught by U.S. Pat. No. 5,590,331, issued Dec. 31, 1996 to Lewis et al., several methods of compilation exist for this purpose. For instance, a pre-execution compilation approach may be used to convert "high level" language into machine specific code prior to execution. On the other hand, a runtime compilation approach may be used to convert instructions and immediately send the machine specific code to the processor for execution. A JAVA program requires a compilation step to create bytecode instructions, which are placed into class files. A class file contains streams of 8-bit bytes either alone or combined into larger values, which contain information about interfaces, fields or methods, the constant pool and the magic constant. Placed into class files, bytecode is an intermediate code, which is independent of the platform on which it is later executed. A single line of bytecode contains a one-byte opcode and either zero or additional bytes of operand information. Bytecode instructions may be used to control stacks, the VM register arrays or transfers. A JAVA interpreter is then used to execute the compiled bytecode instructions on the platform.

The compilation step is accomplished with multiple passes through the bytecode instructions, where during each pass, a loop process is employed in which a method loops repeatedly through all the bytecode instructions. A single bytecode instruction is analyzed during each single loop through the program and after each loop, the next loop through the bytecode instructions analyzes the next single bytecode instruction. This is repeated until the last bytecode instruction is reached and the loop is ended.

During the first compilation pass, a method loops repeatedly through all the bytecode instructions and a single bytecode instruction is analyzed during each single loop through the program. If it is determined the bytecode instruction being analyzed is the last bytecode instruction, the loop is ended. If the bytecode instruction being analyzed is not the last bytecode instruction, the method determines stack status from the bytecode instruction and stores this in stack status storage, which is updated for each bytecode instruction. This is repeated until the last bytecode instruction is reached and the loop is ended.

During the second compilation pass, a method loops repeatedly through all the bytecode instructions once again and a single bytecode instruction is analyzed during each single loop through the program. If it is determined the bytecode instruction being analyzed is the last bytecode instruction, the loop is ended. If the bytecode instruction being analyzed is not the last bytecode instruction, the stack status storage and bytecode instruction are used to translate the bytecode instruction into machine code. This is repeated until the last bytecode instruction is translated and the loop is ended.

A JAVA program however, also requires a verification step to ensure malicious or corrupting code is not present. As with most programming languages, security concerns are addressed through verification of the source code. JAVA applications ensure security through a bytecode verification process which ensures the JAVA code is valid, does not overflow or underflow stacks, and does not improperly use registers or illegally convert data types. The verification process traditionally consists of two parts achieved in four passes. First, verification performs internal checks during the first three passes, which are concerned solely with the bytecode instructions. The first pass checks to ensure the proper format is present, such as bytecode length. The second pass checks subclasses, superclasses and the constant pool for proper format. The third pass actually verifies the bytecode instructions. The fourth pass performs runtime checks, which confirm the compatibility of the bytecode instructions.

As stated, verification is a security process, which is accomplished through several passes. The third pass in which actual verification occurs, employs a loop process similar to the compilation step in which a method loops repeatedly through all the bytecode instructions and a single bytecode instruction is analyzed during each single loop through the program. After each loop, the next loop through the bytecode instructions analyzes the next single bytecode instruction which is repeated until the last bytecode instruction is reached and the loop is ended.

During the verification pass, the method loops repeatedly through all the bytecode instructions and a single bytecode instruction is analyzed during each single loop through the program. If it is determined the bytecode instruction being analyzed is the last bytecode instruction, the loop is ended. If the bytecode instruction is not the last bytecode instruction, the position of the bytecode instruction being analyzed is determined. If the bytecode instruction is at the beginning of a piece of code that is executed contiguously (a basic block), the global stack status is read from bytecode auxiliary data and stored. After storage, it is verified that the stored global stack status is compliant with the bytecode instruction. If however, the location of the bytecode instruction being analyzed is not at the beginning of a basic block, the global stack status is not read but is verified to ensure the global stack status is compliant with the bytecode instruction. After verifying that the global stack status is compliant with the bytecode instruction, the global stack status is changed according to the bytecode instruction. This procedure is repeated during each loop until the last bytecode instruction is analyzed and the loop ended.

It may be noted that the pass through the bytecode instructions that is required for verification closely resembles the first compilation pass. Duplicate passes during execution can only contribute to the poor speed of JAVA programs, which in some cases may be up to 20 times slower than other programming languages such as C. The poor speed of JAVA programming is primarily the result of verification. In the past, attempts to improve speed have included compilation during idle times and pre-verification. In U.S. Pat. No. 5,970,249 issued Oct. 19, 1999 to Holzle et al., a method is taught in which program compilation is completed during identified computer idle times. And in U.S. Pat. No. 5,999,731 issued Dec. 7, 1999 to Yellin et al. the program is pre-verified, allowing program execution without certain determinations such as stack overflow or underflow checks or data type checks. Both are attempts to improve execution speed by manipulation of the compilation and verification steps. In order to further improve speed, a method and apparatus is needed that can combine these separate, yet similar steps, the verification pass, and the first and second compilation pass, into a step which accomplishes the multiple tasks in substantially less time.

BRIEF SUMMARY OF THE INVENTION

It is the object of the present invention to create a method and apparatus which may be used to combine compilation and verification of platform independent bytecode, either on the development system or within the target system, into optimized machine code thereby improving execution speed. Considering the required steps of bytecode compilation and verification, similarities between the two may be used to combine steps thereby reducing the time required to achieve both. The new method consists of a program instruction set which executes fewer passes through a bytecode instruction listing where complete verification and compilation is achieved, resulting in optimized machine code.

The new method loops repeatedly through all the bytecode instructions and a single bytecode instruction is analyzed during each single loop through the program. If it is determined the bytecode instruction being analyzed is the last bytecode instruction, the loop is ended. If the bytecode instruction is not the last bytecode instruction however, the position of the bytecode instruction is determined and if the bytecode instruction being analyzed is at the beginning of a piece of code that is executed contiguously (a basic block), the global stack status is read from bytecode auxiliary data and stored. After storage, it is verified that the stored global stack status is compliant with the bytecode instruction. If however, the location of the bytecode instruction being analyzed is not at the beginning of a basic block, the global stack status is not read, but is verified to ensure the global stack status is compliant with the bytecode instruction. After verifying that the global stack status is compliant with the bytecode instruction, the global stack status is changed according to the bytecode instruction being analyzed. In addition, stack status is determined from the bytecode instruction being analyzed and stored in stack status storage. In doing so, the new method achieves complete verification and partial compilation (the steps traditionally performed during separate verification and compilation in the prior art).

Next, the new method loops repeatedly through all the bytecode instructions and if it is determined the bytecode instruction being analyzed is the last bytecode instruction, the loop is ended, otherwise the pass is repeated for each bytecode listing within each class file. If the bytecode instruction is not the last bytecode instruction, the stack status storage and bytecode instruction are used to translate the bytecode instruction being analyzed into optimized machine code and this is repeated until the last bytecode instruction is translated and the loop is ended.

The new method achieves complete verification and compilation of the bytecode instructions into optimized machine code on the development or target system. Through the combined steps, compilation and verification occur simultaneously using the new method.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF PRESENTLY PREFERRED EXEMPLARY EMBODIMENTS

The present invention provides an improved method and apparatus to perform platform independent bytecode compilation and verification creating optimized machine code on an independent platform. The present invention, by creating a new bytecode compilation method combined with instruction verification, increases the speed and applicability of bytecode programming.

Figure 1A:
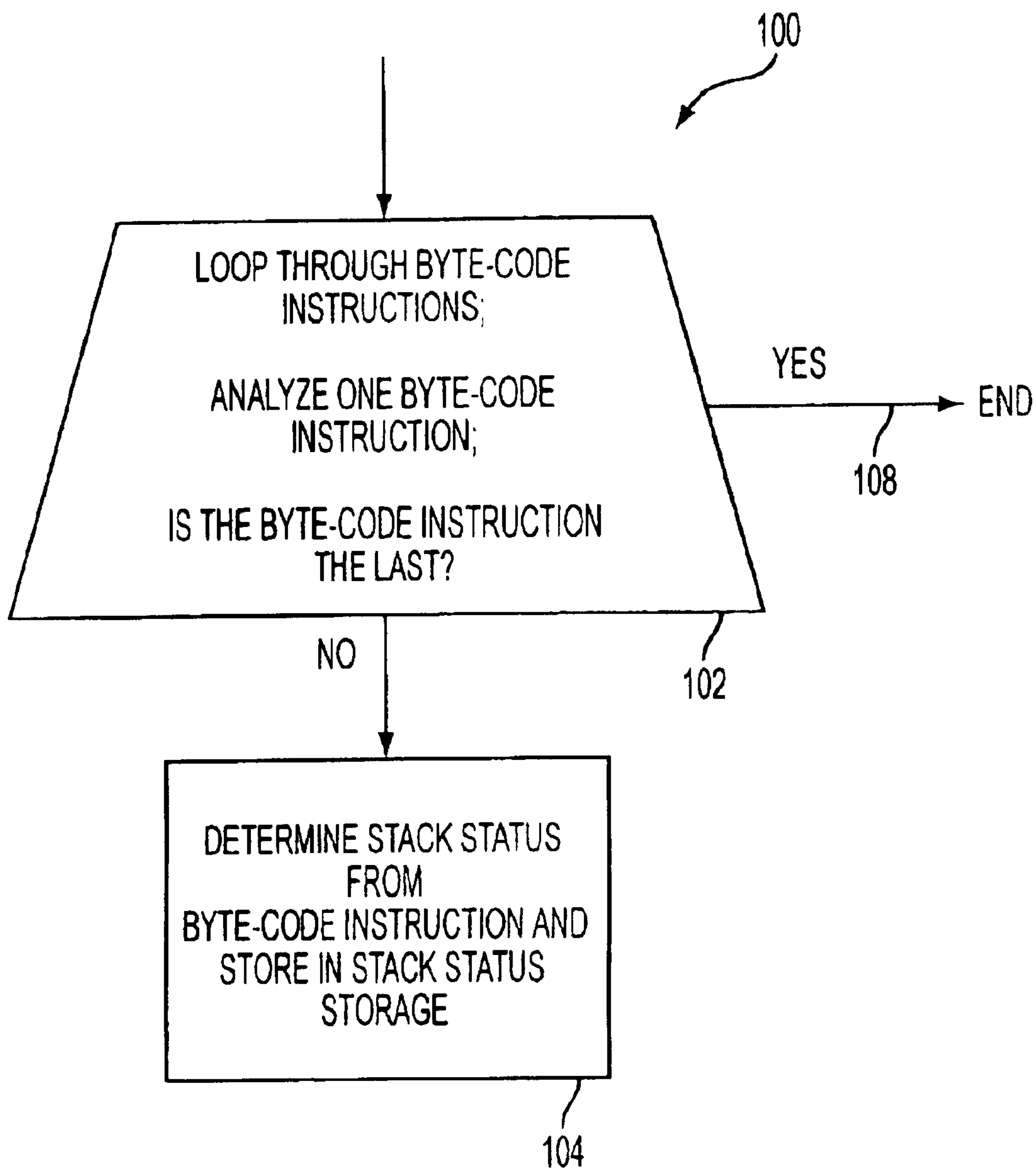
FIG. 1A (prior art) illustrates a flowchart of traditional bytecode instruction first pass compilation.
Figure 1B:
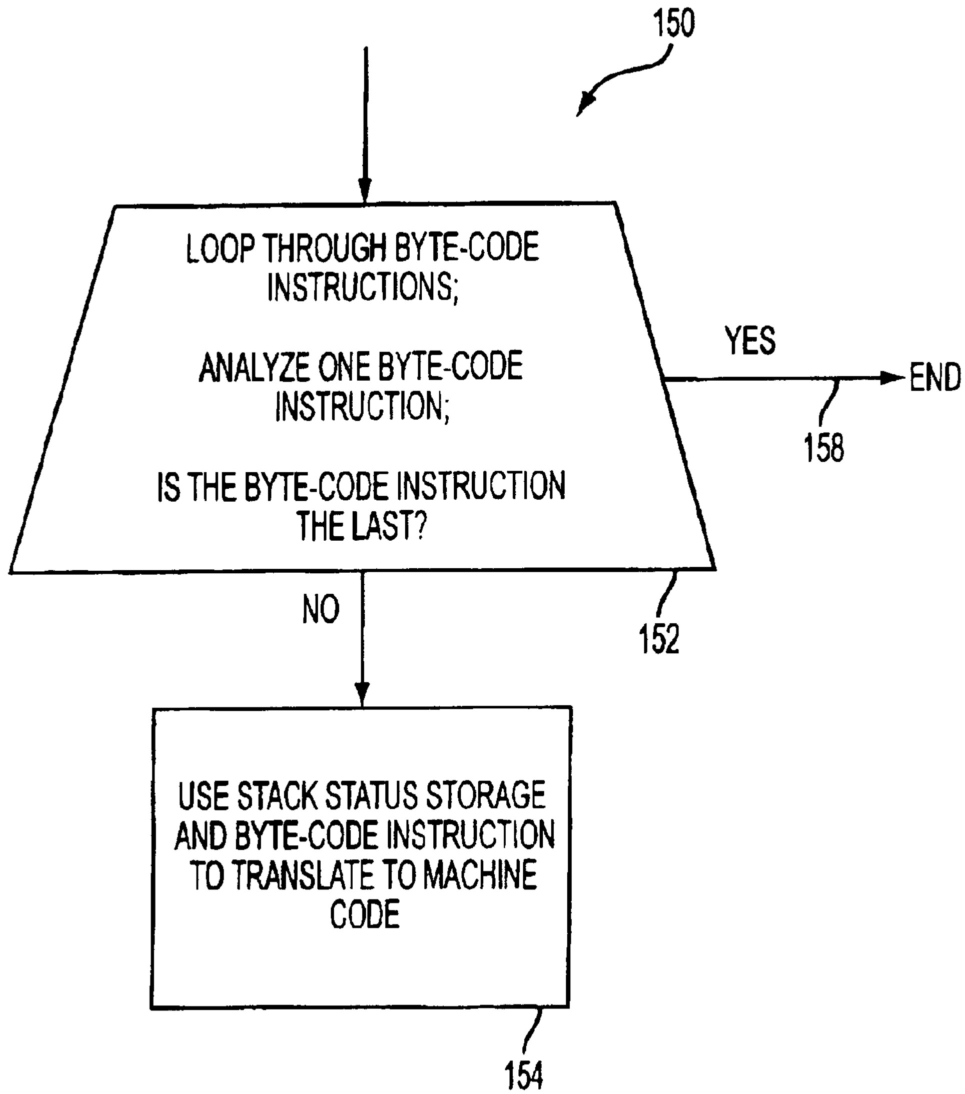
FIG. 1B (prior art) illustrates a flowchart of traditional bytecode instruction second pass compilation.

In prior art FIGS. 1A and 1B, an illustrative flow diagram of traditional bytecode compilation is shown. In prior art FIG. 1A, a traditional compilation method is shown as flow diagram 100 which loops through the bytecode instructions, analyzing an individual bytecode instruction during each loop as stated in step 102. After each bytecode instruction is analyzed, the method determines the stack status from the bytecode instruction being analyzed and stores the stack status in stack status storage as stated in step 104. When the last bytecode instruction is analyzed as stated step 102, the loop is ended at step 108 and partial compilation is completed.

In prior art FIG. 1B, remaining compilation occurs in flow diagram 150 which shows further loops through the bytecode instructions analyzing an individual bytecode instruction during each loop as stated in step 152. The stack status storage and bytecode instruction are then used to translate the bytecode instruction into machine code as stated in step 154. When the last bytecode instruction is translated as stated in step 152, the loop is ended at step 158 and compilation is completed.

Figure 2:
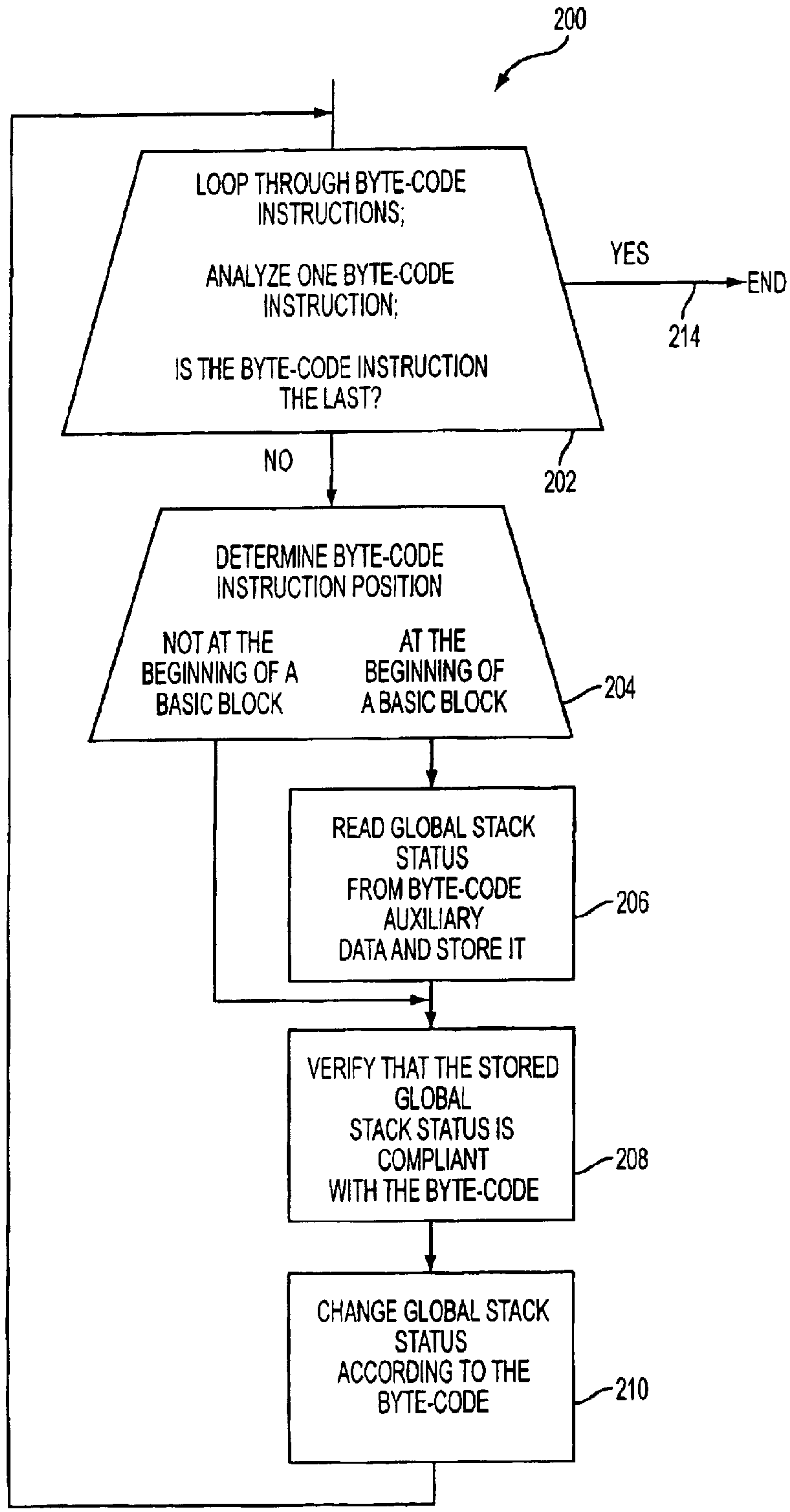
FIG. 2 (prior art) illustrates a flowchart of traditional bytecode instruction verification.

In prior art FIG. 2, an illustrative flow diagram of traditional bytecode verification is shown in flow diagram 200 which loops through the bytecode instructions, analyzing each until the last instruction is reached as stated in step 202. During each loop, the method analyzes a single bytecode instruction and if the method determines it has reached the last bytecode instruction, the loop is ended at step 214. Otherwise, the method determines the bytecode instruction position as stated in step 204. If the bytecode instruction being analyzed is at the beginning of a basic block, then the method reads the global stack status from bytecode auxiliary data and stores it as stated in step 206. After storage, the method verifies that the stored global stack status is compliant with the bytecode instruction as stated in step 208. If the bytecode instruction is not at the beginning of a basic block as stated in step 204, the global stack status is not read, but is verified to ensure the global stack status is compliant with the bytecode instruction as stated in step 208. In this case, step 206 is omitted. The global stack status is then changed according to the bytecode instruction as stated in step 210. This is repeated for each bytecode instruction until the last instruction is analyzed as stated in step 202 and the loop is ended at step 214.

Figure 3:
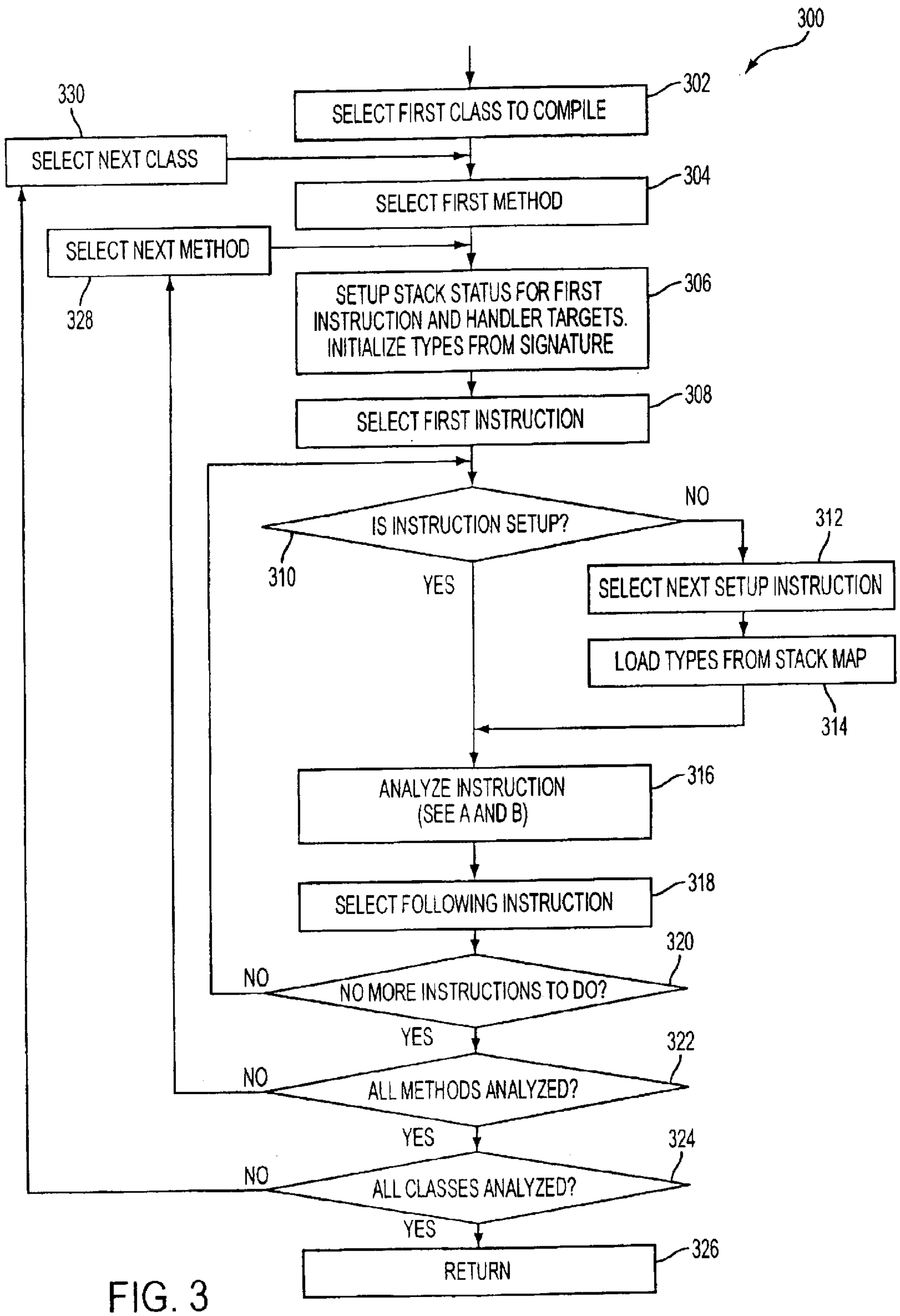
FIG. 3 illustrates a main flowchart of the embodiment of the new method.
Figure 4A:
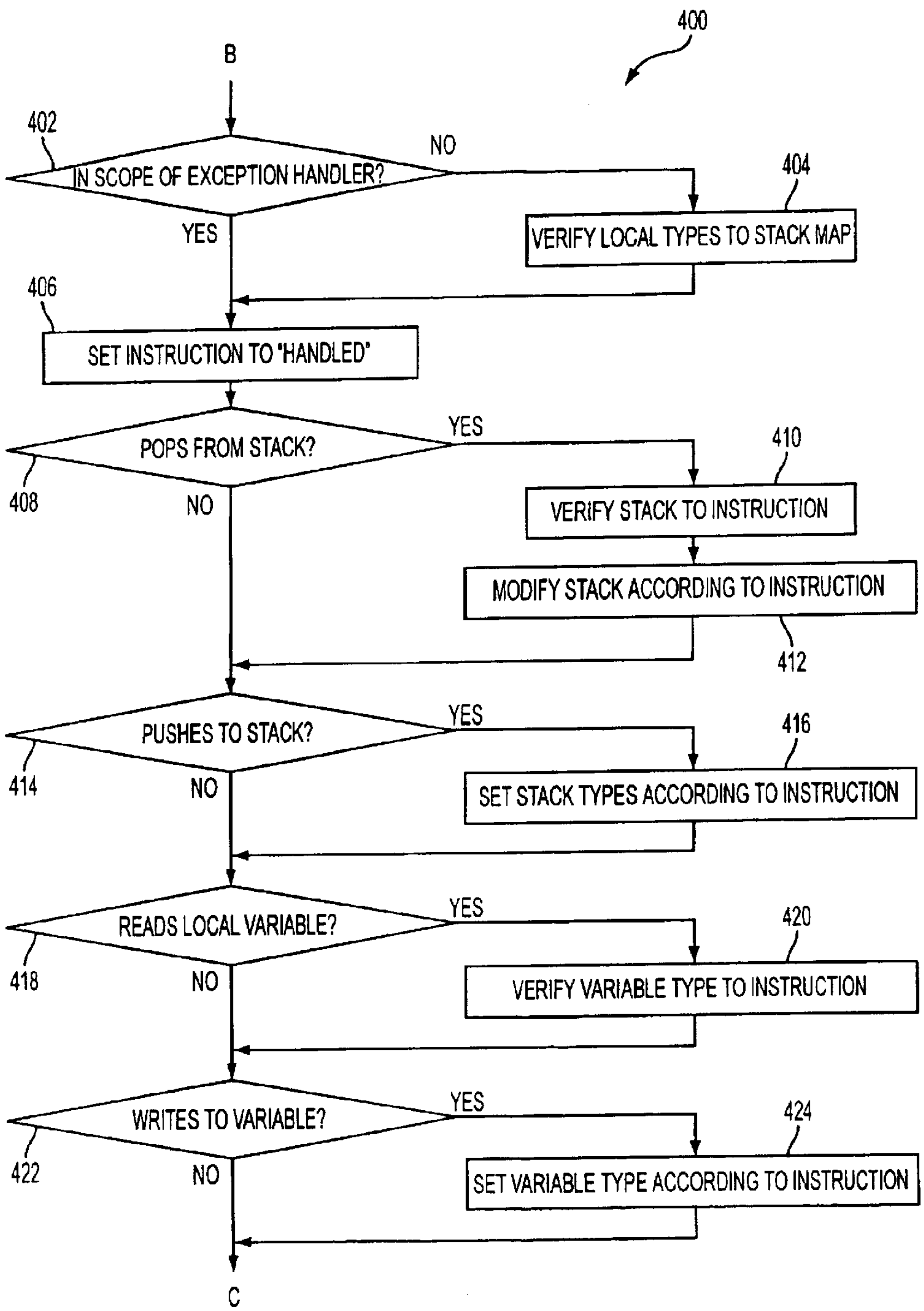
FIG. 4A illustrates a subset flowchart of the embodiment of the new method.
Figure 4B:
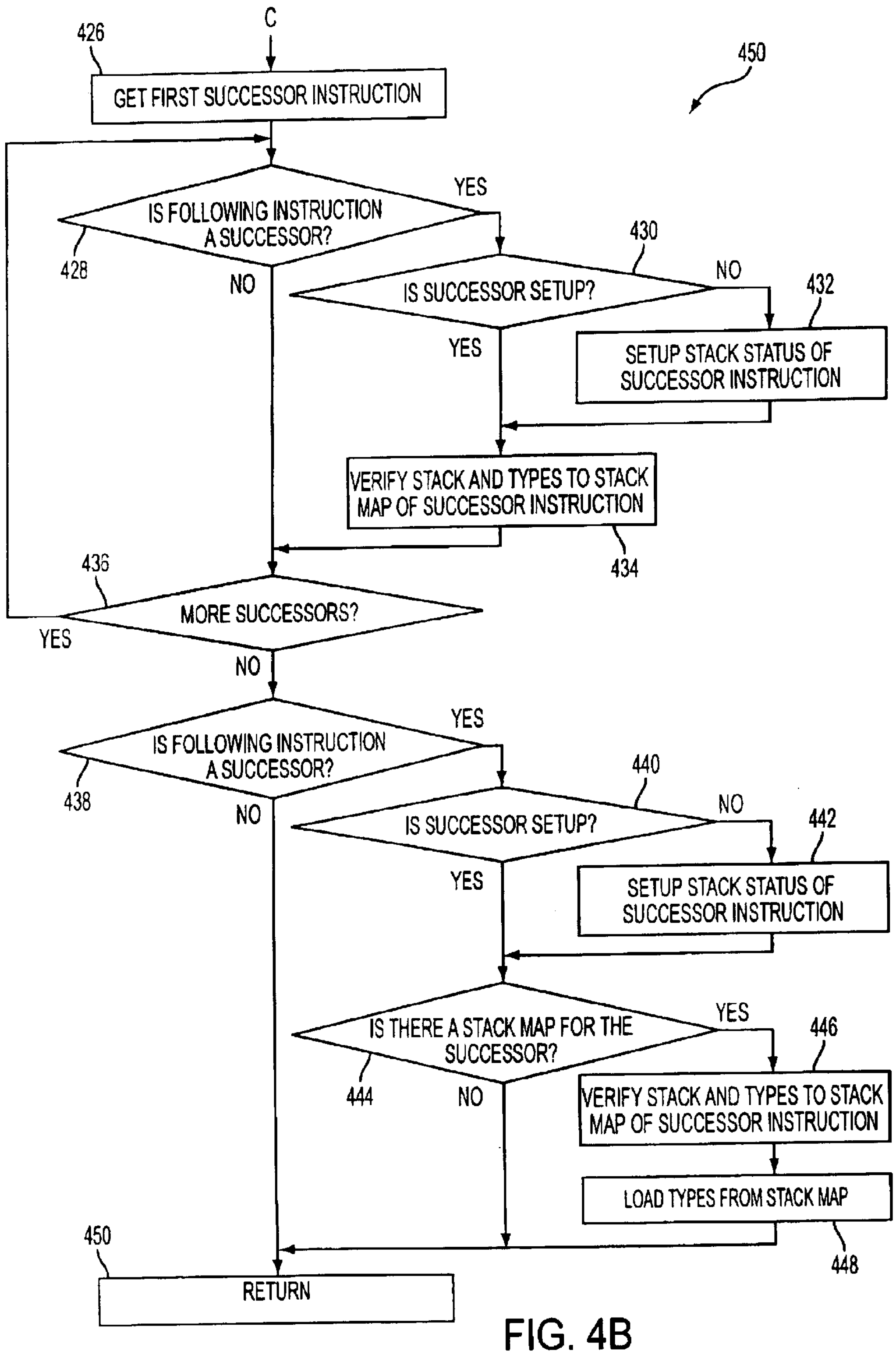
FIG. 4B further illustrates a subset flowchart of the embodiment of the new method.

In FIGS. 3, 4A and 4B an illustrative flow diagram of the new method is shown. It may be noted from earlier prior art Figures that the pass through the bytecode instructions that is required for verification resembles compilation procedures. In the case of verification, the effect of the bytecode instruction on the stack must be analyzed and stored as a global stack status (i.e. a single storage location that is updated for every bytecode). This global storage stack must be filled from auxiliary data each time a basic block of data is entered. In the case of compilation, a similar analysis must be performed, however the stack status must be stored (in less detail) in stack status storage for each bytecode instruction analyzed.

The present invention provides an improved method and apparatus to perform platform independent bytecode compilation and verification creating optimized machine code on an independent platform. The present invention creates a new method in which bytecode compilation is combined with instruction verification thereby increasing the speed and applicability of bytecode programming.

FIG. 3 is a main flowchart of a method 300 for combined bytecode verification and compilation in accordance with the new invention. In step 302, a class file placed on the development or target system is selected and a first method within the first class file is selected in step 304. At this point, the stack status for the first instruction and handler targets is set up in step 306. In step 308 a first bytecode instruction is selected and evaluated to determine if the instruction is setup in step 310. If the instruction is setup, the instruction is analyzed as outlined in FIGS. 4A and 4B. If the instruction is not setup, the next setup instruction is selected in step 312 and types are loaded from the stack map in step 314.

Once the instruction has been analyzed in step 316, the following instruction is selected in step 318. If there are no remaining instructions as determined in step 320, the next method is selected in steps 322 and 328. If there are no remaining methods, the next class is selected in steps 324 and 330. If there are no remaining classes, the evaluation returns in step 326.

FIGS. 4A and 4B are subset flowcharts of a method 400 for the analyses of each bytecode instruction from step 316 in FIG. 3. In step 402, the selected instruction is checked to determine if it is within the scope of the exception handler. If it is, the compatibility between the actual local variable types and the exception handler stack map entry in bytecode is verified in step 404. If not, the instruction is set to "handled" in step 406 and the stack status of the actual instruction is copied to the new stack status.

Next the instruction is evaluated to determine if there is a resulting pop from the stack in step 408 or a resulting push to the stack in step 414. If there is a resulting pop from the stack indicating an overflow condition, the compatibility between the stack status and expected values is verified in step 410 and the new stack status is then modified according to the instruction in step 412. If there is a resulting push to the stack indicating an underflow condition, the new stack status is modified according to the instruction and new actual stack types are set according to the instruction in step 416.

In steps 418 and 422 the instruction is evaluated to determine if the instruction reads a local variable or writes to a local variable. If the instruction reads a local variable, the compatibility between the actual local variable type and the instruction is verified in step 420. If the instruction writes to a local variable, the variable type is modified according to the actual instruction.

In step 426, the first successor instruction is evaluated. The instruction immediately following the actual instruction, determined in step 428, is dealt with in step 438 after all other successor instructions have been dealt with by step 436. Each successor instruction other than the instruction immediately following the actual instruction is evaluated in step 430 to determine if the instruction is marked as "none". If the successor instruction is marked as "none", the stack status of the successor instruction is initialized to the new stack status and the successor instruction is marked as "setup" in step 432 and the compatibility between the new stack status and the stack map for the successor instruction in the bytecode is verified. The compatibility between the actual stack, local variable types and stack map for the successor instruction is verified in step 434 and repeated until no further successor instructions remain.

If the instruction is immediately following the actual instruction, step 438 determines if the instruction is a successor instruction and if so, step 440 determines if the instruction is marked as "none". If the successor instruction is marked as "none", the stack status of the following instruction is initialized to the new stack status and the following instruction is marked as "setup" in step 442. The compatibility between the new stack status and the stack map is verified. If there is a stack map for the successor instruction in step 444, the compatibility between the actual stack, local variable types and stack map for the successor instruction is verified in step 446 and types are loaded from the stack map in step 448. Once completed, step 450 returns to the main flowchart at step 318.

Referring to Table 1, the new combined compilation and verification method places each class file in the development or target system, at which point each method in the class containing bytecode instructions is analyzed. The stack status for the first instruction and handler targets is setup. Temporary storage is created for stack status and marks for each bytecode instruction, in addition temporary storage for actual types of stack values and local variables is created.

Next, the method initializes the stack status of the first instruction to empty and the stack status of the exception handler target instructions is initialized to contain the given exception. The marks of the first instruction and handler target instructions are set to "setup" and all other marks are set to "none". The method signature is then used to initialize actual local variable types and the first bytecode instruction is set to be the actual instruction. This is repeated until no further instructions are marked as "setup".

The next subsequent bytecode instruction in turn which is marked as "setup" is set to be the actual instruction. The actual stack and local variable types from the stack map belonging to the actual instruction (each bytecode instruction) are loaded. If the actual instruction is within the scope of the exception handler, the compatibility between the actual local variable types and the exception handler stack map entry in bytecode is verified. Once verified or where the actual instruction is not within the scope of the exception handler, the selected bytecode instruction is set to "handled" and the stack status of the actual instruction is copied to new stack status.

If the actual instruction pops one or more values from the stack, the compatibility between the stack status and expected values is verified and the new stack status is then modified according to the instruction. If the actual instruction pushes one or more values to the stack, the new stack status is modified according to the instruction and new actual stack types are set according to the instruction.

A check for overflow and underflow conditions occurs next. If the actual instruction pops one or more values from the stack, check for underflow and verify the compatibility between the stack status and expected values and then modify the new stack status is according to the instruction. If there is no underflow condition, overflow conditions are evaluated. If the actual instruction pushes one or more values to the stack, check for overflow and modify the new stack status according to the instruction and new actual stack types are set according to the instruction.

Once overflow and underflow checks are performed, the instruction is evaluated to determine if it reads a local variable or writes to a local variable. If the actual instruction reads a local variable, the compatibility between the actual local variable type and the instruction is verified. If the actual instruction writes to a local variable, the actual local variable type is modified according to the actual instruction.

The first successor instruction is then evaluated. For each successor instruction except the one immediately following the actual instruction, if the successor instruction is marked as "none", the stack status of the successor instruction is initialized to the new stack status and the successor instruction is marked as "setup". The compatibility between the new stack status and the stack map for the successor instruction in the bytecode is verified. Once the successor is "setup", or if it was already "setup", the compatibility between the actual stack, local variable types and stack map for the successor instruction in the bytecode is also verified.

If the instruction immediately following the actual instruction is a successor of the actual instruction and the following instruction is marked as "none", the stack status of the following instruction is initialized to the new stack status. The following instruction is then marked as "setup". Once the successor is "setup", or if it was already "setup", if there is a stack map in the bytecode for the following instruction, the compatibility between new stack status and the stack map is verified. The compatibility between actual stack, local variable types and the stack map is also verified. The actual types are then loaded from the stack map and the actual instruction is changed to the immediately following instruction. The process is repeated for each method within each class file, and thereafter repeated for each class file.

Prior art improvement methods in which computer idle time is filed with compilation steps and pre-verification, do not teach a method of combining verification and compilation steps. Also, idle time compilation is constantly subject to interruption and pre-verification may not eliminate all malicious code present. The result of using the new method shown in FIGS. 3, 4A, 4B and Table 1, is complete compilation and verification into optimized machine code with fewer program operations and reduced process times.

I claim:

1. A computer apparatus suitable for use in the combined compilation and verification of platform neutral bytecode instructions resulting in optimized machine code, comprising:

a central processing unit (CPU);

a computer memory coupled to said CPU, said computer memory comprised of a computer readable medium;

a compilation-verification program embodied on said computer readable medium, said compilation-verification program comprising:

a first code segment that receives a bytecode listing;

a second code segment that simultaneously (a) verifies said bytecode listing is free of malicious and improper code and (b) compiles said bytecode listing into optimized machine code; and a third code segment that interprets and executes said machine code.

2. A computer apparatus suitable for use in the combined compilation and verification of platform neutral bytecode instructions resulting in optimized machine code, comprising:

a development or target computer system, said development or target computer system comprised of a computer readable storage medium containing a compilation verification program and one or more class files, said one or more class files containing one or more methods containing bytecode instruction listings;

said compilation-verification program contained on said storage medium comprised of a first plurality of subset instructions, said first plurality configured to execute verification of said bytecode instruction listings;

said compilation-verification program contained on said storage medium further comprised of a second plurality of subset instructions, said second plurality configured to execute compilation of said bytecode instruction listings; and wherein said verification and said compilation executed by said first and second plurality of subset instructions are executed simultaneously to produce optimized machine code.

3. A computer apparatus as recited in claim 2 wherein said first plurality of subset instructions evaluates said bytecode instructions to detect improper data types and improper stack usage.

4. A computer apparatus as recited in claim 2 wherein said second plurality of subset instructions evaluates said bytecode instructions for complete compilation of said bytecode instructions into said optimized machine code.

5. A computer implemented method for facilitating combined compilation and verification of platform neutral bytecode instructions resulting in optimized machine code, comprising the steps of:

receiving a class file onto a computer readable medium containing compilation procedure instructions, said class file containing one or more methods containing platform neutral bytecode listings;

executing said compilation procedure instructions on said bytecode listings, said compilation procedure instructions also simultaneously verifying said bytecode listings;

producing verified optimized machine code on said computer readable medium; and wherein said compilation procedure instructions include instructions for a) creating storage for each bytecode instruction to store stack status and marks, b) creating storage to store actual types of stack values and local variables, and c) initializing stack status of a first bytecode instruction to "empty."

6. A computer implemented method as recited in claim 5 wherein said compilation procedure instructions include instructions to initialize stack status of exception handler target instructions to contain a given exception object.

7. A computer implemented method as recited in claim 6 wherein said compilation procedure instructions include instructions to set marks of said first bytecode instruction and handler target instructions to "setup."

8. A computer implemented method as recited in claim 7 wherein said compilation procedure instructions include instructions to set all other marks to "none."

9. A computer implemented method as recited in claim 8 wherein said compilation procedure instructions include instructions to initialize actual local variable types from method signature.

10. A computer implemented method as recited in claim 9 wherein said compilation procedure instructions include instructions to set sets said a first bytecode instruction to be the actual instruction.

11. A computer implemented method as recited in claim 10 wherein said compilation procedure instructions include instructions to repeat until there are no more instructions marked as "setup."

12. A computer implemented method as recited in claim 10 wherein said compilation procedure instructions include instructions to determine if said actual instruction is not marked as "setup" and if not marked as "setup" then:

selecting the next instruction in the bytecode marked as "setup" as said actual instruction; and loading actual stack and local variable types from the a stack map in bytecode belonging to said actual instruction.

13. A computer implemented method as recited in claim 12 wherein said compilation procedure instructions include instructions to determine if said actual instruction is in the scope of an exception handler and if said actual instruction is in the scope then:

verify compatibility between actual local variable types and variable types required for the stack map for an exception handler entry in bytecode.

14. A computer implemented method as recited in claim 13 wherein said compilation procedure instructions include instructions to set the mark of selected instruction to "handled."

15. A computer implemented method as recited in claim 14 wherein said compilation procedure instructions include instructions to copy stack status of actual instruction to new stack status.

16. A computer implemented method as recited in claim 15 wherein said compilation procedure instructions include instructions to determine if said actual instruction pops one or more values from a stack and if said actual instruction pops one or more values from said stack then:

verify compatibility between variable types in the stack status and the values expected by said actual instruction; and modify new stack status according to said actual instruction.

17. A computer implemented method as recited in claim 16 wherein said compilation procedure instructions include instructions to determine if said actual instruction pushes one or more values to a stack and if said actual instruction pushes one or more values to the stack then:

modify new stack status according to said actual instruction; and set new actual stack types according to said actual instruction.

18. A computer implemented method as recited in claim 17 wherein said compilation procedure instructions include instructions to determine if said actual instruction reads a local variable and if said actual instruction reads said local variable then:

verify compatibility between actual local variable types and variable types required for said actual instruction.

19. A computer implemented method as recited in claim 18 wherein said compilation procedure instructions include instructions to determine if said actual instruction writes to a local variable and if said actual instruction writes to said local variable then:

modify actual local variable types according to said actual instruction.

20. A computer implemented method as recited in claim 19 wherein said compilation procedure instructions include instructions to determine if a successor instruction is immediately following said actual instruction and if said successor instruction is not immediately following said actual instruction then:

if said successor instruction is marked as "none," initialize the stack status of said successor instruction to the new stack status and mark said successor instruction as "setup;"

verify compatibility between new stack status and a status of said stack map for said successor instruction in the bytecode; and verify compatibility between local variable types for the actual stack and variable types required for a stack map for said successor instruction in the bytecode.

21. A computer implemented method as recited in claim 20 wherein said compilation procedure instructions include instructions to determine if an instruction immediately following said actual instruction is a successor of said actual instruction and if said following instruction is a successor of said actual instruction then:

if said successor instruction is marked as "none," initialize the stack status of said following instruction to the new stack status and mark said following instruction as "setup;"

if there is a stack map in the bytecode for said following instruction, verify compatibility between new stack status and status for a stack map for said successor instruction in the bytecode; and verify compatibility between local variable types of said actual stack and stack map for said successor instruction in the bytecode.

22. A computer implemented method as recited in claim 21 wherein said compilation procedure instructions include instructions to change said actual instruction to the immediately following instruction.

23. A computer implemented method as recited in claim 22 wherein said compilation procedure instructions include instructions to repeat for each said method.

24. A computer implemented method as recited in claim 23 wherein said compilation procedure instructions include instructions to repeat for each said class file.

* * * * *